3,767,594
DEHYDROGENATION CATALYST

Kenneth D. Vesely, Arlington Heights, and Harold D. Gass, Jr., Cicero, Ill., assignors to Universal Oil Products Company, Des Plaines, Ill.
No Drawing. Filed Aug. 20, 1970, Ser. No. 65,718
Int. Cl. B01j 11/16, 11/74
U.S. Cl. 252—439
10 Claims

ABSTRACT OF THE DISCLOSURE

A catalyst composition characterized by a method of manufacture. The catalyst composition comprises a platinum group metal, germanium, and an alkali metal composited with an alumina carrier material. The alumina carrier material is impregnated with the catalytic components, steam treated at oxidizing conditions including a temperature of from about 400° to about 1200° F., and further treated in a substantially dry atmosphere at oxidizing conditions including a temperature of from about 400° to about 1200° F., to yield a product characterized by a LOI at 900° C. of less than about 1 wt. percent prior to reduction and sulfiding.

---

This invention relates to a hydrocarbon conversion catalyst and a method of manufacture, the catalyst being particularly adapted for use in the dehydrogenation of paraffinic hydrocarbons. The catalytic dehydrogenation of saturated hydrocarbons to produce more useful and valuable unsaturated hydrocarbons has been widely practiced. The various olefinic products are in demand in the petroleum, petrochemical, heavy chemical, pharmaceutical and plastic industries to produce many useful products. Thus, propane is converted to propylene which is utilized in the manufacture of isopropyl alcohol, propylene dimer, cumene, polypropylene, isoprene and the like. Butane is converted to butene-1 and butene-2 which are extensively used in the manufacture of polymer and alkylate gasolines, while isobutane is converted to isobutylene which finds use in the production of isooctane, butyl rubber, etc. n-Dodecenes, produced by the dehydrogenation of n-dodecane, are a useful intermediate in the manufacture of biodegradable alkylbenzene sulfonate detergents.

While dehydrogenation can be accomplished thermally without the aid of a catalyst, the relatively high temperatures required are conducive to cracking and other undesirable side reactions leading to poor product distribution and excessive carbon formation. A particularly suitable dehydrogenation catalyst which functions at close to equilibrium reaction conditions with a minimum of cracking and other undesirable side reactions is described by Haensel et al. in U.S. Pat. 3,291,855. Briefly, the catalyst comprises a refractory metal oxide, particularly alumina, containing from about 0.01 to about 1.5 wt. percent lithium and from about .05 to about 5 wt. percent of a Group VIII metal, especially platinum, composited therewith. It is an object of this invention to provide a further improved catalyst characterized by its method of manufacture and comprising a platinum group metal, germanium and an alkali metal composited with an alumina carrier material.

In one of its broad aspects, the present invention embodies a catalyst composition comprising a platinum group metal, germanium and an alkali metal composited with an alumina carrier material and manufactured by (a) preparing an impregnating solution comprising a germanium compound, a platinum group metal compound, a halide and an alkali metal compound and commingling an alumina carrier material therewith; (b) evaporating said impregnating solution in contact with said alumina to yield a product characterized by a loss on ignition (LOI) at 900° C. of less than about 60 wt. percent; (c) treating the impregnated alumina at a temperature of from about 400° to about 1200° F. in a steam atmosphere at oxidizing conditions and reducing the halide content thereof to less than about 0.1 wt. percent; (d) thereafter further treating the impregnated alumina at a temperature of from about 400° to about 1200° F. in a substantially dry atmosphere to yield a product characterized by a LOI at 900° C. of less than about 1.0 wt. percent; and (e) reducing and sulfiding.

A more specific embodiment relates to a catalyst comprising platinum, germanium and lithium composited with an alumina carrier material and manufactured by (a) preparing germanium tetrahalide in ethanolic solution and forming an impregnating solution comprising said ethanolic solution admixed with an aqueous solution of chloroplatinic acid, hydrochloric acid and lithium nitrate, and commingling an alumina carrier material therewith; (b) evaporating said solution in contact with said alumina to yield a product characterized by from about a 50 to about a 55 wt. percent loss on ignition at 900° C.; (c) treating the impregnated alumina at a temperature of from about 400° to about 700° F. in a steam atmosphere at oxidizing conditions for a period of from about 1 to about 3 hours, and thereafter at a temperature of from about 900° to about 1200° F. in a steam atmosphere at oxidizing conditions for a period to reduce the chloride level thereof to less than about .07 wt. percent; (d) thereafter further treating the impregnated alumina at a temperature of from about 400° to about 1200° F. in a substantially dry atmosphere to yield a product characterized by a LOI at 900° C. of less than about 1.0 wt. percent; and (e) reducing and sulfiding.

Other objects and embodiments of this invention will become apparent in the following detailed specification.

Considering first the alumina component of the catalyst composition, it will be appreciated that, although other factors are involved including the temperature at which the final catalyst composition is calcined, the physical properties of the alumina carrier material initially employed have a substantial if not determinative influence on the physical properties of the final catalyst composition. Thus, it is preferred to employ a porous, adsorptive, high surface area material characterized by a surface area of from about 150 to about 500 square meters per gram. Suitable aluminas thus include gamma-alumina, eta-alumina, and theta-alumina, the first mentioned gamma-alumina being preferred. A particularly preferred alumina is gamma-alumina characterized by an average bulk density of from about 0.20 to about 0.60 grams per cubic centimeter, an average pore diameter of from about 20 to about 300 angstroms, an average pore volume of from about 0.10 to about 1.0 cubic centimeter per gram, and a surface area of from about 125 to about 400 square meters per gram.

The alumina employed may be a naturally occurring alumina or it may be synthetically prepared in any conventional or otherwise convenient manner. The alumina is typically employed in a shape or form determinative of the shape or form of a final catalyst composition, e.g., spheres, pills, granules, extrudates, powder, etc. A particularly preferred form of alumina is the sphere. One preferred method of preparation which affords a convenient means of developing the desired physical characteristics is substantially in accordance with the oil-drop method described in U.S. Pat. 2,620,314. Thus, an alumina sol, preferably an aluminum chloride sol such as is prepared by digesting aluminum pellets in hydrochloric acid, is dispersed as droplets in a hot oil bath whereby gelation occurs with the formation of spheroidal gel particles. In this type of operation, the alumina is set chemically utilizing ammonia as a neutralizing or setting agent. Usually the ammonia is furnished by an ammonia precursor which is included in the sol, most often urea, hexamethylenetetramine or mixtures thereof. Only a fraction of the ammonia precursor is hydrolyzed or decomposed in the relatively short period during which the initial gelation occurs. During the subsequent aging process, the residual precursor retained in the spheroidal particles continues to hydrolyze and effect further polymerization of the alumina whereby the pore characteristics of the material are established. The alumina particles are aged, usually for a period of from about 24 hours, at a predetermined temperature, usually from about 120 to about 220° F., and at a predetermined pH value. Pressure aging techniques are utilized advantageously to increase the strength of the alumina particles and to effect a substantial reduction in the required aging time.

As previously stated, the foregoing method affords a convenient means of developing the desired physical characteristics of the carrier material. The method includes a number of process variables which affect the physical properties of the alumina and the catalyst subsequently prepared therefrom. Generally, the aluminum/chloride mole ratio of the alumina sol will influence the apparent bulk density of the alumina product and, correspondingly, the pore volume and pore diameter characteristics attendant therewith, lower ratios tending toward higher bulk densities. Other process variables affecting the physical properties of the catalyst include the time, temperature and pH at which the particles are aged. Usually, temperatures in the lower range and the shorter aging periods tend toward higher apparent bulk densities. Surface area properties are normally a function of calcination temperature, a temperature of from about 800° to about 1500° F. being suitably employed.

Pursuant to the present invention, the alumina carrier material is commingled with an impregnating solution comprising a germanium compound, a platinum group metal compound, a halide and an alkali metal compound. Preferably, the alumina carrier material is commingled with an impregnating solution prepared by admixing an alcoholic solution of a germanium tetrahalide with an aqueous solution of a platinum group metal and an alkali metal compound. Thus, prior to admixing the germanium component in the impregnating solution, the same is prepared in alcoholic solution—suitably reagent grade ethanol containing minor amounts of methyl and isopropyl alcohols, although other alcohols including methyl alcohol, propyl alcohol, isopropyl alcohol, etc., may be utilized. It is contemplated that the germanium tetrahalide is solubilized in the alcohol as a germanium alkoxide and subsequently deposited on the alumina carrier material as such. In any case, it is preferable to age the germanium tetrahalide in alcoholic solution for a period of at least about 24 hours and preferably for at least about 48° hours, prior to admixing the alcoholic solution with the platinum group metal compound and the alkali metal compound in aqueous solution. Germanium tetrachloride is a preferred tetrahalide although the tetrabromide, tetraiodide or tetrafluoride may also be employed. The selected germanium tetrahalide is employed in an amount to yield a finished catalyst composite comprising from about .05 to about 5 wt. percent germanium.

In the further preparation of the impregnating solution, the described alcoholic solution is admixed with a platinum group metal compound and an alkali metal compound in aqueous solution. Suitable platinum group metal compounds include chloroplatinic acid, ammonium chloroplatinate, dinitrodiaminoplatinum, chloropalladic acid, and the water soluble platinum, palladium, rhodium, rubidium, osmium, and iridium chlorides. The platinum group metal compound, preferably chloroplatinic acid, is included in the impregnating solution in an amount to provide a finished catalyst composite comprising from about 0.05 to about 5 wt. percent platinum group metal. With respect to the alkali metal compound component of the impregnating solution, said compound is utilized in an amount to deposit from about 0.01 to about 1.5 wt. percent alkali metal on the alumina carrier material whereby the inherent cracking activity of the platinum group metal component is substantially obviated. Of the alkali metals, i.e., cesium, rubidium, potassium, sodium and lithium, lithium is preferred. Suitable alkali metal compounds include the chlorides, sulfates, nitrates, acetates, and the like. Lithium nitrate is particularly suitable.

An acid, preferably a mineral acid such as hydrochloric acid, nitric acid, etc., not effecting precipitation of the other components of the impregnating solution, is advantageously included therein to accomplish an improved distribution of the catalytic components on the alumina carrier material. The acid is effected in a mole ratio of from about .02 to about 0.1 with the alumina.

The alumina carrier material is preferably maintained in contact with the impregnating solution at ambient temperature under quiescent conditions for a brief period, suitably for about 10 minutes, and the impregnating solution thereafter evaporated substantially to dryness at an elevated temperature. For example, the alumina particles are tumbled in the impregnating solution in a rotary steam dryer while the solution is evaporated substantially to dryness such that the dried particles will contain less than about 60 wt. percent volatile matter as evidenced by a loss on ignition at 900° C. of less than about 60 wt. percent and preferably from about 50 to about 55 wet. percent.

The alumina particles thus impregnated with the catalytically active metallic components are further treated in a steam atmosphere under oxidizing conditions suitably in an air atmosphere containing about 20 wt. percent steam, at a temperature of from about 400° to about 1200° F. until the halide level of the catalyst has been reduced to less than about 0.1 wt. percent thereof and preferably to less than about 0.07 wt. percent. The catalyst particles are advantageously treated with a minimum of breakage in a two-step process whereby the catalyst particles are first treated for a period of from about 1 to about 3 hours in a steam atmosphere under oxidizing conditions at a temperature of from about 400° to about 700° F., and thereafter at a temperature of from about 900° to about 1200° F. for a time sufficient to reduce the halide content thereof to the desired level, suitably for a period of from about 3 to about 5 hours.

Although the prior art contains extensive teachings of reduction and sulfiding techniques with respect to various hydrocarbon conversion catalysts, the significance of the level of volatile matter associated with the catalyst prior to reduction and sulfiding has not heretofore been recognized. The level of volatile matter has been found to be of particular significance with respect to selectivity and stability of the dehydrogenation catalyst of this invention as will appear with reference to the appended examples. Accordingly, pursuant to the present invention, the oxidized catalyst is further treated at a temperature of from about 400° to about 1200° F. in a substantially dry atmosphere to yield a product characterized by a LOI at 900° C. of less than about 1 wt. percent prior to reduction and sulfiding thereof. The catalyst is suitably treated in contact with a stream of dry air dried in contact with molecular sieves.

As heretofore indicated, the catalyst of this invention is typically and advantageously reduced and sulfided prior to use as a catalyst for the dehydrogenation of paraffinic hydrocarbons as herein contemplated. Sulfiding serves primarily to inhibit cracking of the hydrocarbon feed stock whereby higher reaction temperatures can be employed with resulting increased conversion to the desired olefinic products. Reduction and sulfiding of the catalyst can be effected by conventional methods known to the art. Reduction and sulfiding thus may be included as a step in the manufacturing process. For example, the oxidized catalyst may be disposed on a moving belt and passed in contact with a dry hydrogen stream, or the catalyst may be treated in contact with dry hydrogen in a moving or fixed bed type of operation. While sulfiding may be similarly effected, utilizing hydrogen sulfide as a sulfiding agent, it is a more desirable practice to transfer the reduced catalyst to a nitrogen-purged conical blender for sulfiding. Preferably, reduction and sulfiding is included as a part of the start-up procedure preliminary to charging the paraffinic hydrocarbon feed stock to the dehydrogenation reactor. Accordingly, the oxidized catalyst is disposed in a fixed bed in the dehydrogenation reactor and treated first at reducing conditions and thereafter sulfided. Reduction of the catalyst is suitably effected by circulating a hydrogen-rich gas stream in contact with the catalyst at a pressure ranging from about atmospheric to about 500 p.s.i.g., suitably at a gaseous hourly space velocity (GHSV) of about 500. Preferably, the hydrogen-rich gas stream will contain in excess of about 95 mole percent hydrogen and be circulated in contact with the catalyst for a period of from about 1 to about 5 hours at a temperature of from about 700° to about 1050° F. Prior to sulfiding, the temperature is reduced to from about 50° to about 300° F. in the hydrogen-rich atmosphere. Further, in the interest of safety, it is good practice to purge residual hydrogen from the system before sulfiding, for example, by circulating dry nitrogen through the system until the off-gas analyzes less than about 1 wt. percent hydrogen. Hydrogen sulfide, which may be diluted with nitrogen, is then charged through the catalyst bed at a temperature in the aforesaid range, suitably at about 250° F. to deposit from about 0.05 to about 1.5 wt. percent sulfur on the catalyst. Typically, sulfiding is effected in less than about 30 minutes.

The dehydrogenation reaction herein contemplated is effected at conditions which include a temperature of from about 750° to about 1300° F., a pressure of from about atmospheric to about 100 pounds per square inch gauge, and a liquid hourly space velocity (LHSV) of from about 1.0 to about 35 or more. The dehydrogenation is usually effected in the presence of hydrogen in an amount to result in a hydrogen/hydrocarbon mole ratio of from about 1 to about 10.

The following examples are presented in illustration of the catalyst of this invention and method of manufacture thereof, and is not intended as an undue limitation on the generally broad scope of the invention as set out in the appended claims.

EXAMPLE I

An impregnating solution was prepared by first admixing 112 cubic centimeters of 70% nitric acid with 42.57 grams of an aqueous chloroplatinic acid solution containing 26.87 wt. percent platinum. Thereafter, 389 grams of germanium tetrachloride in reagent grade ethanol, and 187 grams of 98% lithium nitrate in aqueous solution were added with continued stirring. The germanium tetrachloride component was aged in said ethanol for 48 hours prior to addition to the impregnating solution. After all the components were added, the impregnating solution was diluted to 2.7 gallons with water.

Alumina (3,053 grams) in the form of 1/16" gamma-alumina spheres was added to the impregnating solution in a rotary steam evaporator and allowed to cold soak for about 10 minutes. Thereafter, the spheres were tumbled in the rotating evaporator and the impregnating solution evaporated to dryness over a period of about 6 hours to achieve a LOI at 900° C. of 50% volatile matter. The catalyst particles were thereafter passed through a dual zone oxidizing oven on a belt conveyor, the catalyst particles being heated in both zones with contact with a stream of air containing about 20 wt. percent steam. The particles were conveyed through the first zone at a rate to establish an average residence time of about 2 hours, and through the second zone at a rate to establish an average time of about 4 hours whereby the chloride level was reduced to less than about 0.07 wt. percent. The first zone was maintained at 600° F. and the second zone at 1000° F. The steam-dried particles, hereinafter referred to as "catalyst A" had a 2.7 wt. percent LOI at 900° C.

The steam dried catalyst was thereafter further dried by passing dry air through a fixed bed thereof for 2 hours at 1000° F. The air-dried catalyst hereinafter referred to as "catalyst B" had a 0.9 wt. percent LOI at 900° C.

The catalyst in each case had a surface area of about 139 square meters per gram, and an average bulk density of about 0.315 gram per cubic centimeter. The catalyst contained 0.45 wt. percent germanium, 0.378 wt. percent platinum, and 0.59 wt. percent lithium.

The described catalysts were evaluated with respect to the dehydrogenation of $C_{11}$–$C_{14}$ n-paraffins. The catalysts were disposed in a fixed bed of a vertical tubular reactor and the hydrocarbon feed stock processed downflow in contact with the catalyst at a liquid hourly space velocity of about 32 together with hydrogen to effect an 8:1 hydrogen/hydrocarbon mole ratio. The reactor pressure was maintained at about 30 p.s.i.g. and the initial temperature of 860° F. was adjusted periodically as tabulated below. The effluent stream was analyzed to determine n-olefin content and the degree of isomerization. The results over a test period in excess of 188 hours are tabulated below.

| | On stream, hours | | | | | | | | | |
|---|---|---|---|---|---|---|---|---|---|---|
| | 20 | | 108 | | 132 | | 172 | | 188 | |
| | [1]860 | | [1]869 | | [1]878 | | [1]887 | | [1]869 | |
| Catalyst | A | B | A | B | A | B | A | B | A | B |
| Olefin product, weight percent: | | | | | | | | | | |
| Normal olefin | 9.07 | 9.53 | 10.12 | 10.52 | 10.83 | 11.37 | 11.57 | 12.07 | 9.25 | 10.13 |
| Non-normal olefin | 0.07 | 0.17 | 0.17 | 0.30 | 0.30 | 0.30 | 0.27 | 0.37 | 0.20 | 0.23 |
| Percent deactivation [2] | | | | | | | | | | 8.6 | 3.7 |

[1] Temperature, ° F.
[2] See formula below:

$$\frac{\text{Initial conversion at 869° F.} - \text{final conversion at 869° F.}}{\text{Initial conversion at 869° F.}} \times 100$$

We claim as our invention:

1. A catalyst comprising a platinum group metal, germanium and an alkali metal composited with an alumina carrier material and manufactured by:
   (a) commingling an alumina carrier material with an impregnating solution prepared by admixing an alcoholic solution of germanium tetrahalide with an aqueous solution containing a platinum group metal compound selected from the group consisting of water soluble platinum, palladium, rhodium, rubidium, osmium, and iridium chlorides, chloroplatinic acid, ammonium chloroplatinate, dinitrodiaminoplatinum, and chloropalladic acid, and an alkali metal compound selected from the group consisting of the alkali metal chlorides, sulfates, nitrates and acetates, the platinum group metal compound, alkali metal compound and germanium tetrahalide concentration of said impregnating solution being sufficient to provide a final catalyst composition containing from about 0.05 to about 5 wt. percent platinum group metal, from about 0.05 to about 5 wt. percent germanium and from about 0.01 to about 1.5 wt. percent alkali metal;

(b) evaporating said impregnating solution on contact with said alumina to yield a product characterized by a LOI at 900° C. of less than about 60 wt. percent;

(c) treating the impregnated alumina at a temperature of from about 400° to about 1200° F. in a steam-containing air atmosphere at oxidizing conditions and reducing the halide content thereof to less than about 0.1 wt. percent;

(d) thereafter further treating the impregnated alumina at a temperature of from about 400° to about 1200° F. in a substantially dry air atmosphere to yield a product characterized by a LOI at 900° C. of less than about 1.0 wt. percent; and (e) reducing and sulfiding the impregnated alumina of step (d).

2. The catalyst of claim 1 further characterized with respect to step (a) in that said germanium tetrahalide is aged in said alcoholic solution for a period of at least about 10 hours prior to forming said impregnating solution.

3. The catalyst of claim 1 further characterized with respect to step (a) in that said germanium tetrahalide is germanium tetrachloride.

4. The catalyst of claim 1 further characterized with respect to step (a) in that said alcoholic solution is an ethanolic solution.

5. The catalyst of claim 1 further characterized with respect to step (a) in that said impregnating solution further comprises hydrochloric acid in from about a .02 to about a 0.1 mole ratio with the alumina commingled therewith.

6. The catalyst of claim 1 further characterized with respect to step (b) in that said solution is evaporated to yield a product characterized by a LOI at 900° C. of from about 50 to about 55 wt. percent.

7. The catalyst of claim 1 further characterized with respect to step (c) in that said impregnated alumina is treated at a temperature of from about 400° to about 700° F. in a steam atmosphere at oxidizing conditions for a period of from about 1 to about 3 hours, and thereafter at a temperature of from about 900° to about 1200° F. in a steam atmosphere at oxidizing conditions for a period to reduce the halide content thereof to less than about .07 wt. percent.

8. The catalyst of claim 1 further characterized with respect to step (a) in that said impregnating solution is prepared utilizing chloroplatinic acid.

9. The catalyst of claim 1 further characterized with respect to step (a) in that said impregnating solution is prepared utilizing lithium nitrate.

10. A catalyst comprising platinum, germanium and lithium composited with an alumina carrier material and manufactured by:

(a) preparing germanium tetrahalide in ethanolic solution and forming an impregnating solution comprising said ethanolic solution admixed with an aqueous solution of chloroplatinic acid, hydrochloric acid and lithium nitrate, the chloroplatinic acid, lithium nitrate, and germanium tetrahalide concentration of said impregnating solution being sufficient to provide a final catalyst composition containing from about 0.05 to about 5 wt. percent platinum group metal, from about 0.05 to about 5 wt. percent germanium and from about 0.01 to about 1.5 wt. percent alkali metal, and commingling an alumina carrier material therewith;

(b) evaporating said solution in contact with said alumina to yield a product characterized by from about a 50 to about a 55 wt. percent loss on ignition at 900° C.;

(c) treating the impregnated alumina at a temperature of from about 400° to about 700° F. in a steam-containing air atmosphere at oxidizing conditions for a period of from about 1 to about 3 hours, and thereafter at a temperature of from about 900° to about 1200° F. in a steam-containing air atmosphere at oxidizing conditions for a period to reduce the chloride level thereof to less than about .07 wt. percent;

(d) thereafter further treating the impregnated alumina at a temperature of from about 400° to about 1200° F. in a substantially dry air atmosphere to yield a product characterized by a LOI at 900° C. of less than about 1.0 wt. percent; and (e) reducing and sulfiding the impregnated alumina of step (d).

References Cited
UNITED STATES PATENTS

| | | | |
|---|---|---|---|
| 3,576,766 | 4/1971 | Rausch | 252—442 |
| 3,578,584 | 5/1971 | Hayes | 252—441 |
| 3,567,656 | 3/1971 | Mitsche | 252—442 |
| 2,906,700 | 9/1959 | Stine | 208—138 |
| 2,906,701 | 9/1959 | Stine | 208—138 |
| 3,293,318 | 12/1966 | Keblys | 260—683.3 |
| 3,531,543 | 9/1970 | Clippinger et al. | 260—683.3 |
| 2,972,644 | 2/1961 | Holme et al. | 252—466 PT |
| 3,647,719 | 3/1972 | Hayes | 252—466 PT |
| 3,617,510 | 11/1971 | Hayes | 252—441 |
| 3,644,198 | 2/1972 | Wilhelm | 252—472 |

DANIEL E. WYMAN, Primary Examiner

P. E. KONOPKA, Assistant Examiner

U.S. Cl. X.R.

252—441, 466 PT; 260—683.3